(12) United States Patent
Van De Stroet

(10) Patent No.: US 12,171,166 B1
(45) Date of Patent: Dec. 24, 2024

(54) HAY BALE HANDLING APPARATUS

(71) Applicant: Dolan Van De Stroet, Inwood, IA (US)

(72) Inventor: Dolan Van De Stroet, Inwood, IA (US)

( * ) Notice: Subject to any disclaimer, the term of this patent is extended or adjusted under 35 U.S.C. 154(b) by 0 days.

(21) Appl. No.: 18/229,726

(22) Filed: Aug. 3, 2023

(51) Int. Cl.
*A01D 87/12* (2006.01)
*A01D 90/02* (2006.01)

(52) U.S. Cl.
CPC ........... *A01D 87/127* (2013.01); *A01D 90/02* (2013.01)

(58) Field of Classification Search
CPC .. A01D 87/127; A01D 87/122; A01D 87/126; A01D 2087/128; A01D 87/0076; A01D 87/003; A01D 90/02; Y10S 414/124; Y10S 241/605; B66F 9/143; B66F 9/144
See application file for complete search history.

(56) References Cited

U.S. PATENT DOCUMENTS

| | | | |
|---|---|---|---|
| 3,208,612 A | 9/1965 | Blair | |
| 4,459,075 A | 7/1984 | Eichenberger | |
| 4,578,008 A | 3/1986 | Gleason | |
| 7,246,479 B2 | 7/2007 | Spaniol | |
| 7,377,457 B2 | 5/2008 | Schierman | |
| 8,142,131 B2 | 3/2012 | Tygard | |
| 8,160,785 B2 * | 4/2012 | Kahle | E02F 9/2267 701/50 |
| 8,740,540 B2 * | 6/2014 | Daraie | B66F 9/18 414/785 |
| 9,043,958 B1 * | 6/2015 | Hennig | A01D 87/127 |
| 9,132,696 B2 * | 9/2015 | Grengs | B60B 30/02 |
| 9,232,695 B1 * | 1/2016 | Hennig | A01D 87/127 |
| 9,296,597 B1 | 3/2016 | Cannon | |
| 2002/0146311 A1 | 10/2002 | Millsap | |
| 2008/0063503 A1 * | 3/2008 | Garrett | A01D 87/122 414/729 |
| 2010/0040436 A1 * | 2/2010 | Bruha | A01D 87/122 414/812 |
| 2015/0373912 A1 * | 12/2015 | Wallace | A01D 87/127 414/800 |
| 2018/0354761 A1 * | 12/2018 | Addicott | B66F 9/146 |
| 2020/0068805 A1 * | 3/2020 | Hanson | A01D 87/122 |
| 2021/0054591 A1 * | 2/2021 | Williams | E02F 9/18 |
| 2022/0095542 A1 * | 3/2022 | Larson | A01D 87/127 |

FOREIGN PATENT DOCUMENTS

| | | | | |
|---|---|---|---|---|
| GB | 2257415 A | * | 1/1993 | ........... A01D 87/127 |
| WO | WO-2013144936 A2 | * | 10/2013 | ........... A01D 87/127 |

* cited by examiner

*Primary Examiner* — Gregory W Adams

(57) ABSTRACT

A hay bale handling apparatus for handling multiple hay bales at once includes a frame which is configured to mount to a vehicle. A pair of bale holder assemblies is coupled to the frame. Each bale holder assembly is configured for holding a hay bale. The bale holder assemblies are laterally spaced from each other with respect to the frame and are movable between a retracted condition and an expanded condition wherein the pair of bale holder assemblies move away from each other from the retracted condition to the expanded condition. At least one actuator is coupled to at least one of the pair of bale holder assemblies. The at least one actuator is operable to move the pair of bale holder assemblies between the retracted condition and the expanded condition.

5 Claims, 9 Drawing Sheets

HAY BALE HANDLING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hay bale handling apparatus and more particularly pertains to a new hay bale handling apparatus for handling multiple hay bales at once.

(2) Description of Related Art Including Information Disclosed Under 37 CFR 1.97 and 1.98

The prior art relates to various hay bale handling apparatuses which handle multiple hay bales at once or handle various sizes of hay bales. However, the prior art fails to disclose such an apparatus which has two hay bale holder assemblies that are drawn alternately toward and away from each other in unison so that hay bales may be separated when picked up and laid in spaced rows.

BRIEF SUMMARY OF THE INVENTION

An embodiment of the disclosure meets the needs presented above by generally comprising a frame which is configured to mount to a vehicle. A pair of bale holder assemblies is coupled to the frame. Each bale holder assembly is configured for holding a hay bale. The bale holder assemblies are laterally spaced from each other with respect to the frame and are movable between a retracted condition and an expanded condition wherein the pair of bale holder assemblies move away from each other from the retracted condition to the expanded condition. At least one actuator is coupled to at least one of the pair of bale holder assemblies. The at least one actuator is operable to move the pair of bale holder assemblies between the retracted condition and the expanded condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
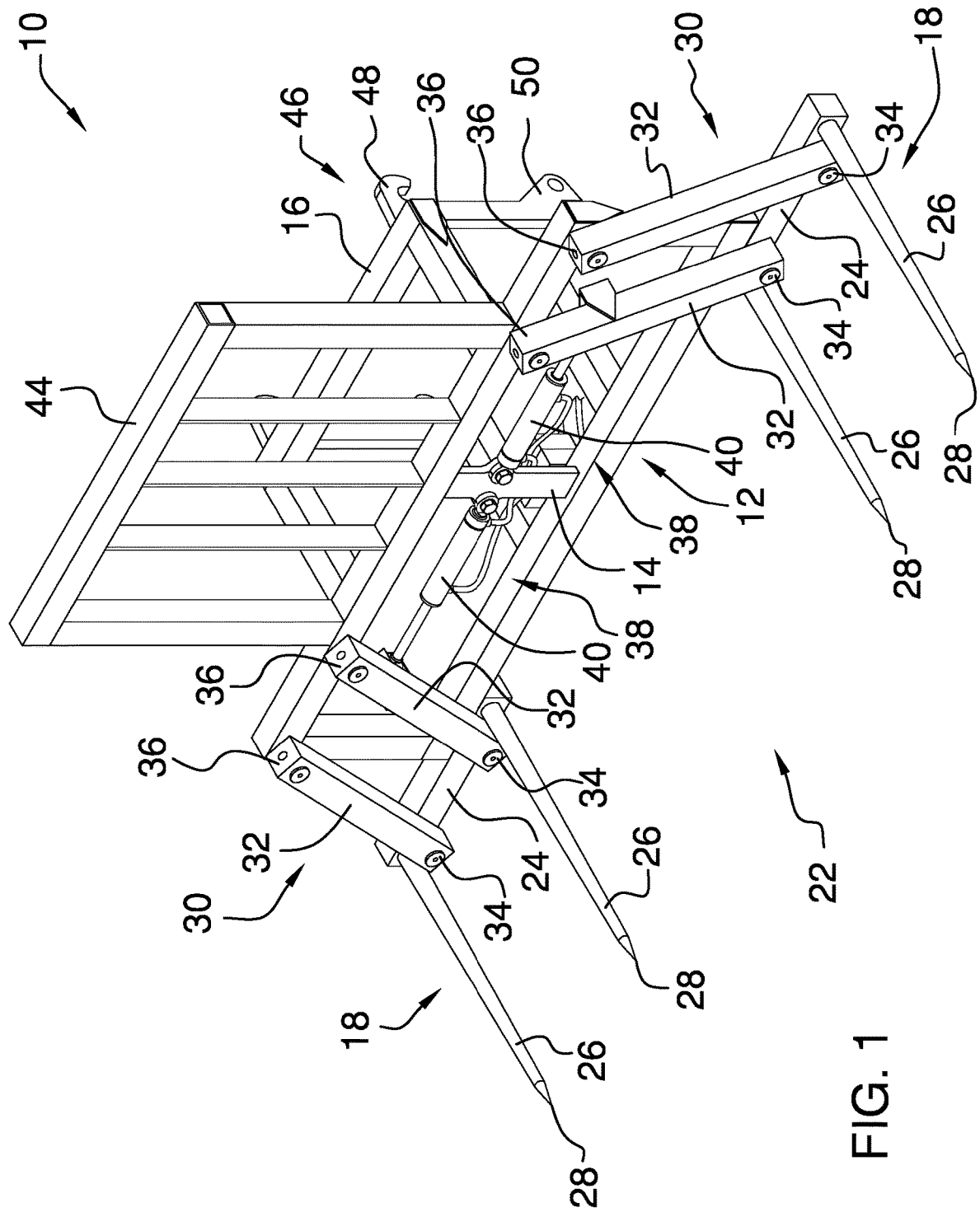
FIG. 1 is a front perspective view of a hay bale handling apparatus according to an embodiment of the disclosure.
Figure 2:
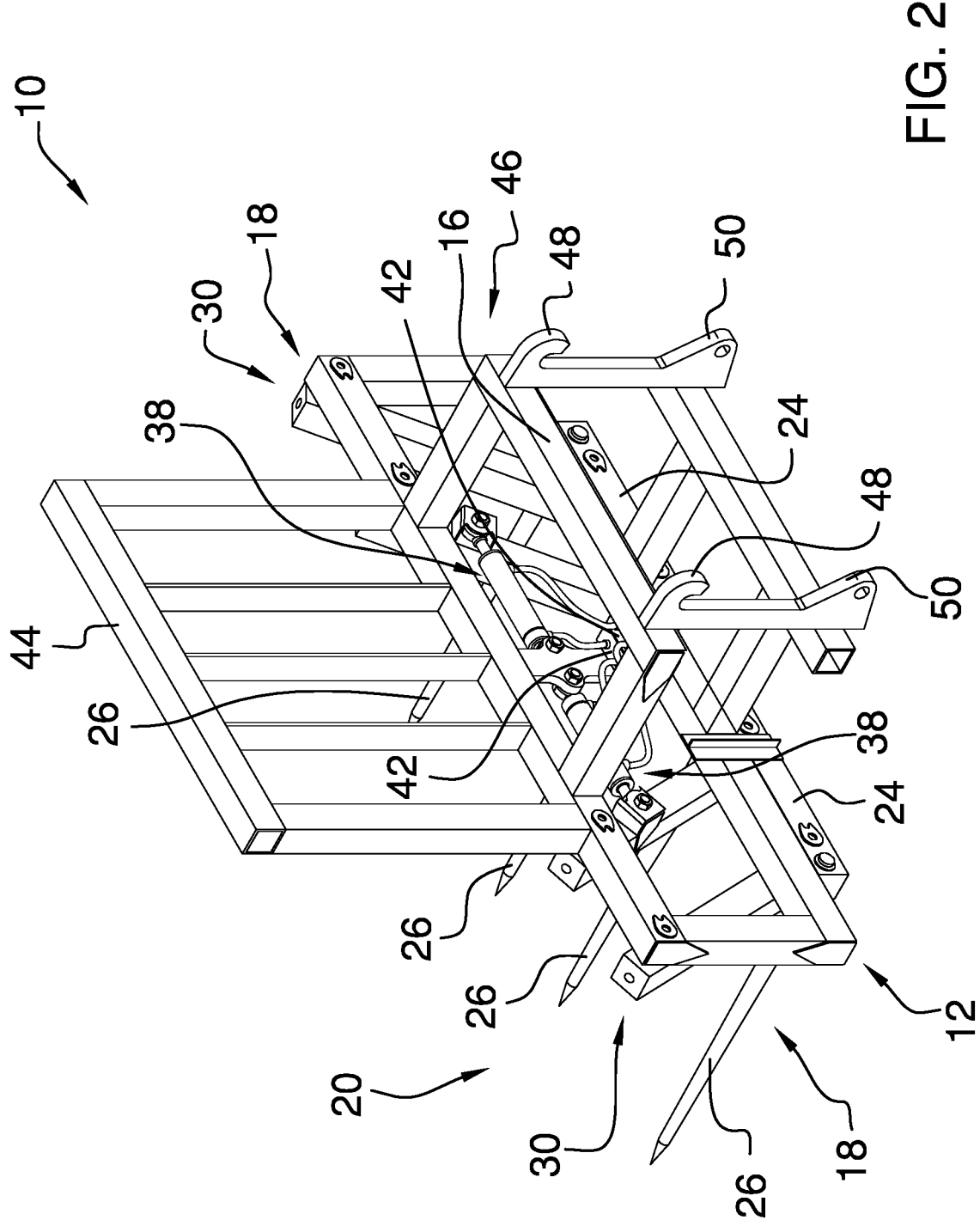
FIG. 2 is a back perspective view of an embodiment of the disclosure.
Figure 3:
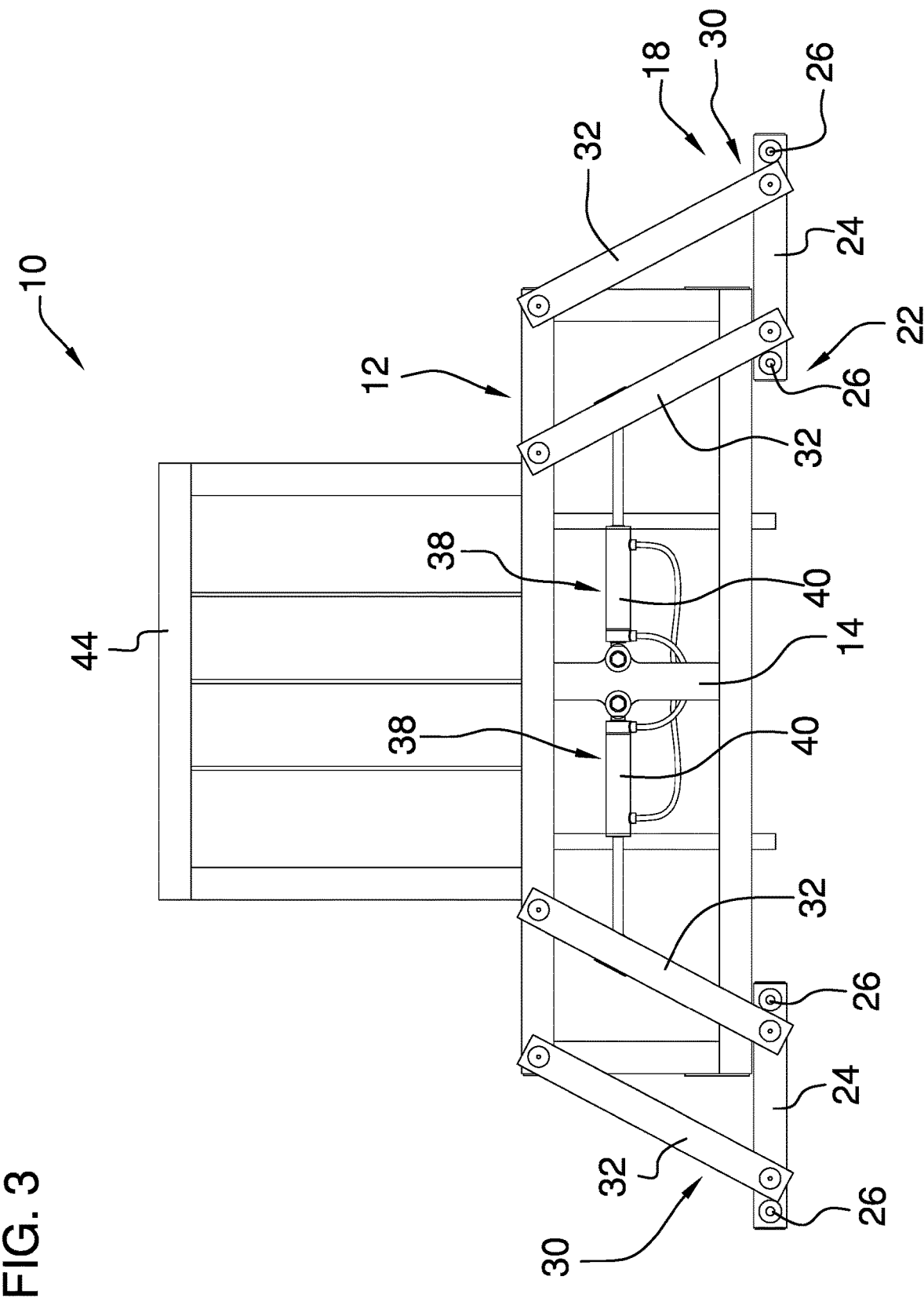
FIG. 3 is a front view of an embodiment of the disclosure.
Figure 4:
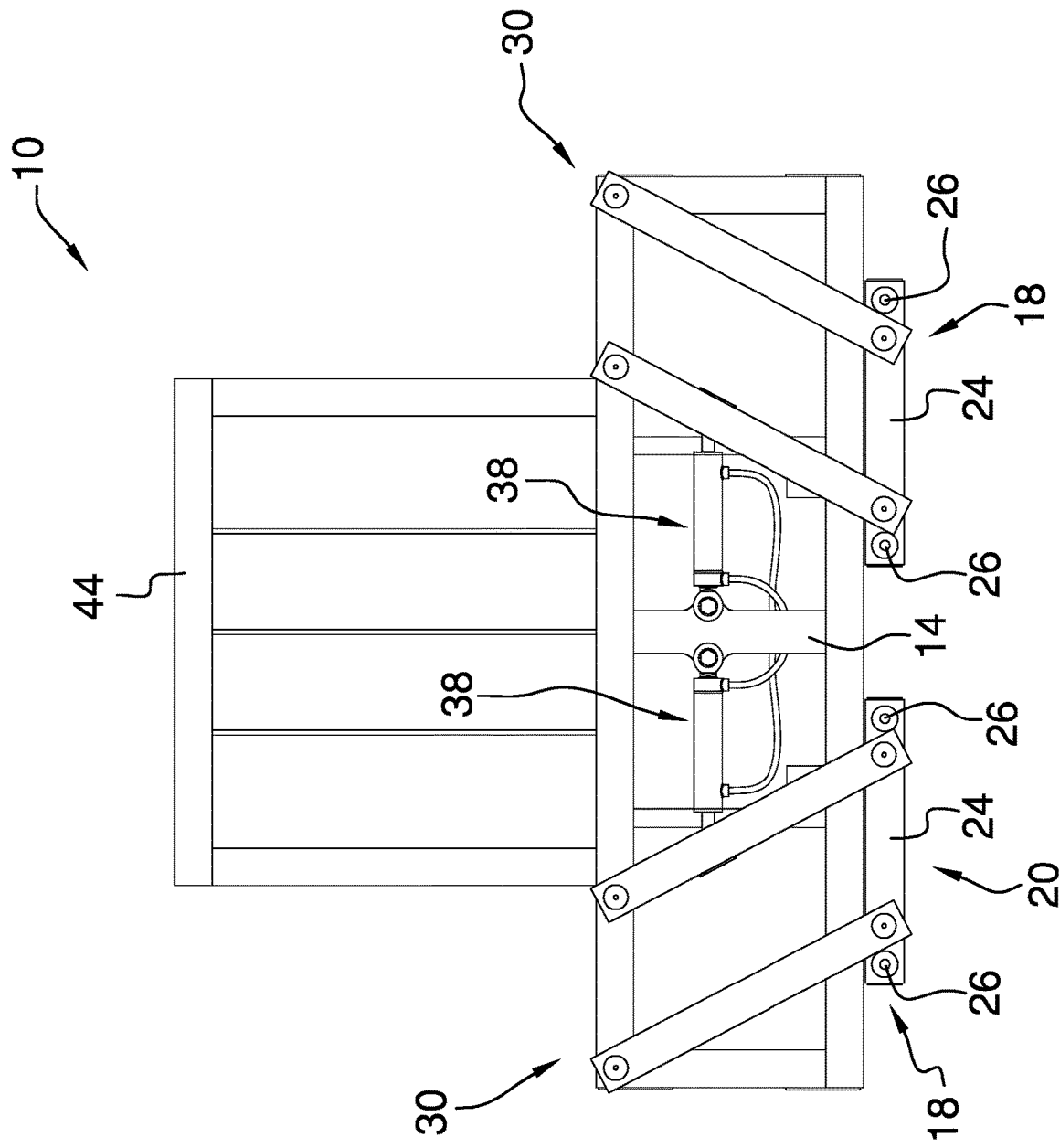
FIG. 4 is a front view of an embodiment of the disclosure.
Figure 5:
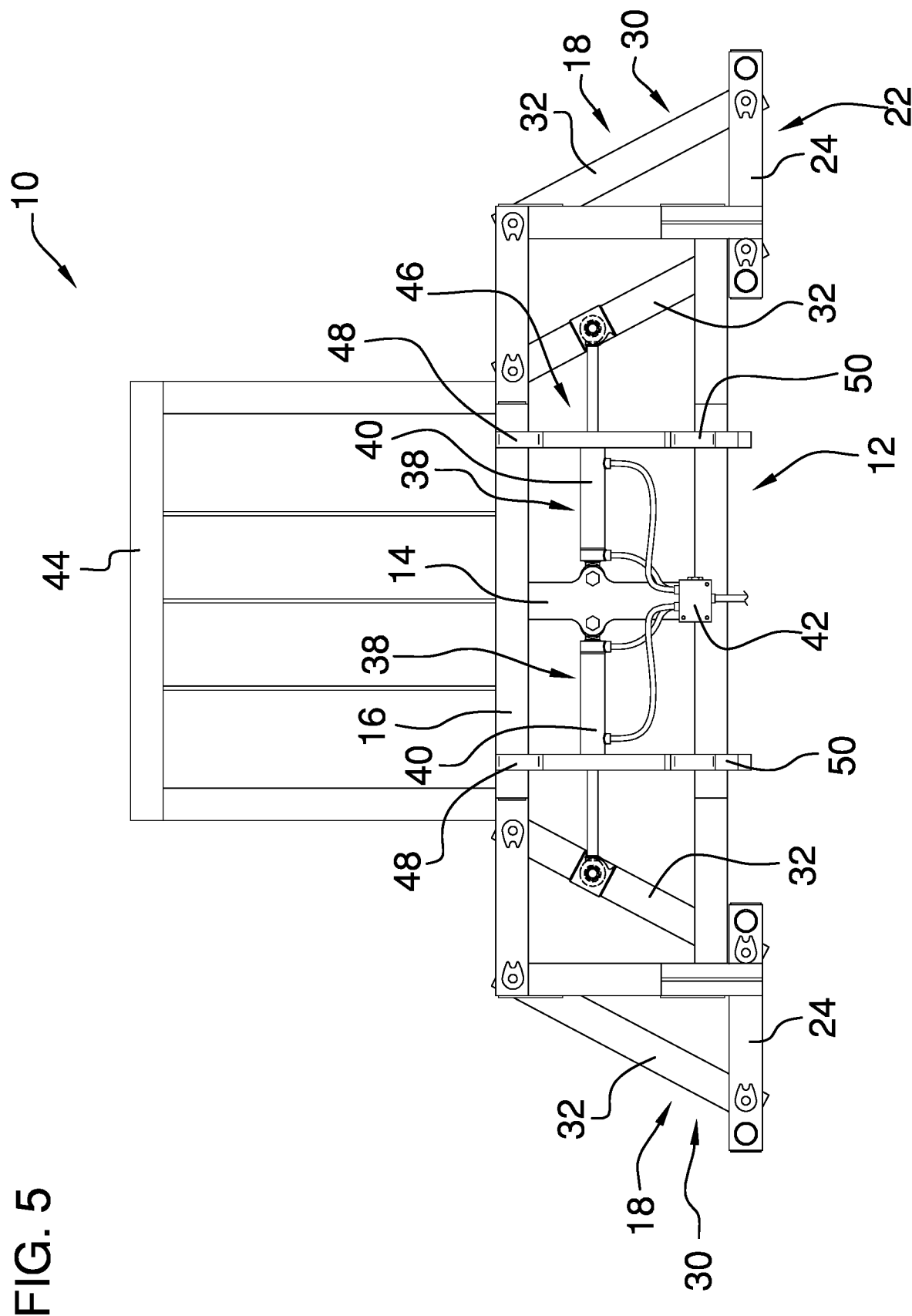
FIG. 5 is a rear view of an embodiment of the disclosure.
Figure 6:
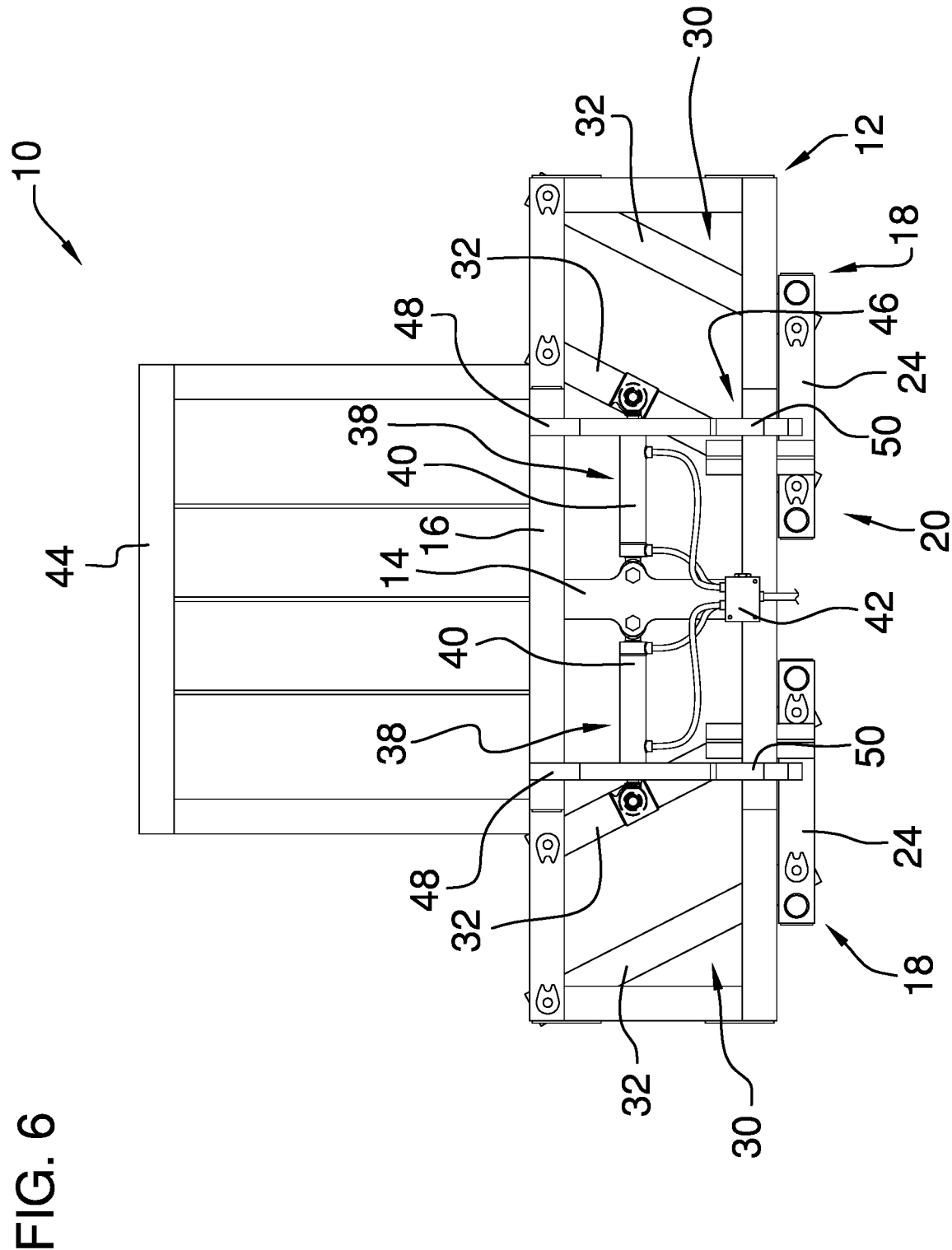
FIG. 6 is a rear view of an embodiment of the disclosure.
Figure 7:
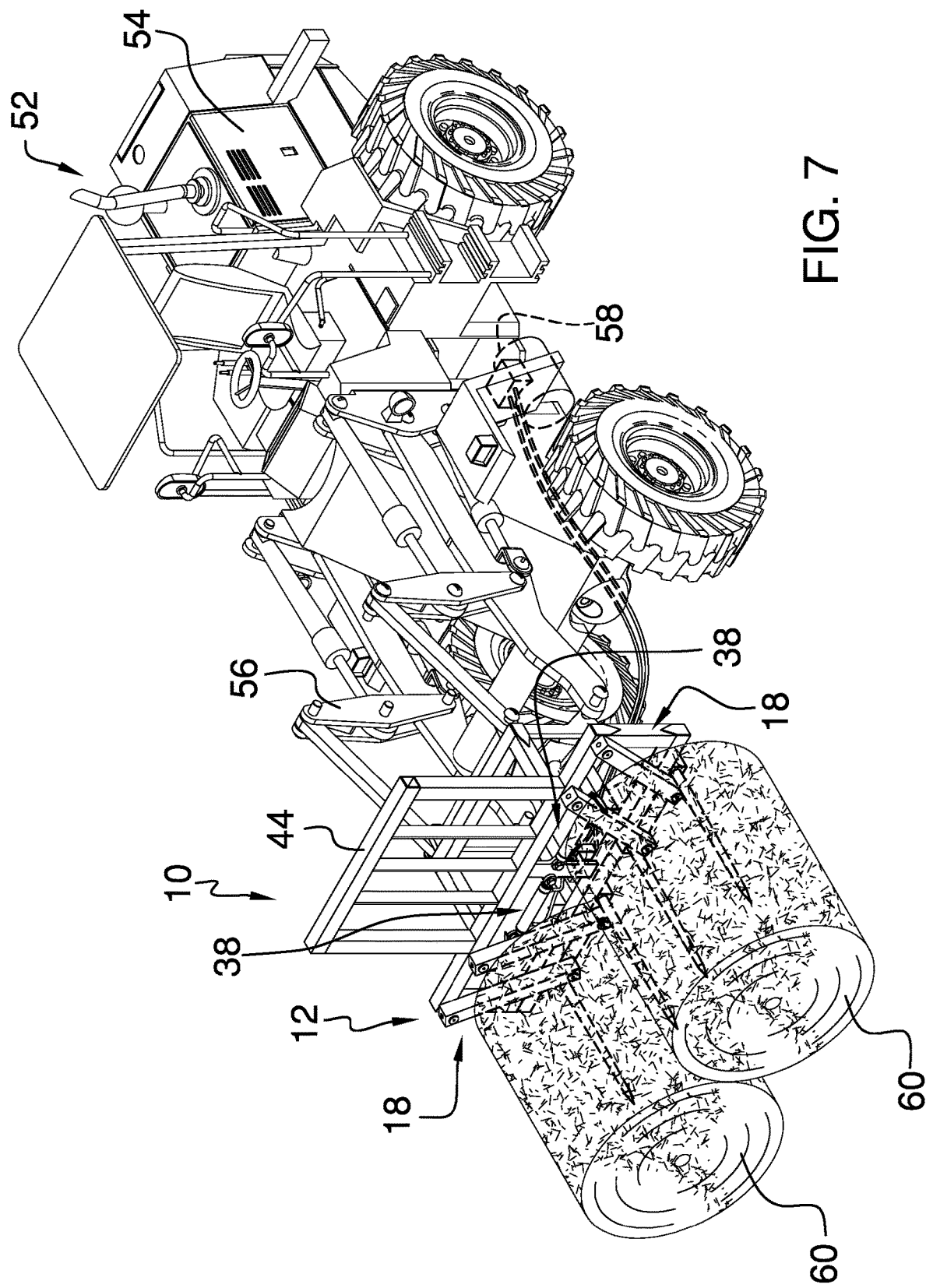
FIG. 7 is an in-use view of an embodiment of the disclosure with a pair of bale holder assemblies in a retracted position.
Figure 8:
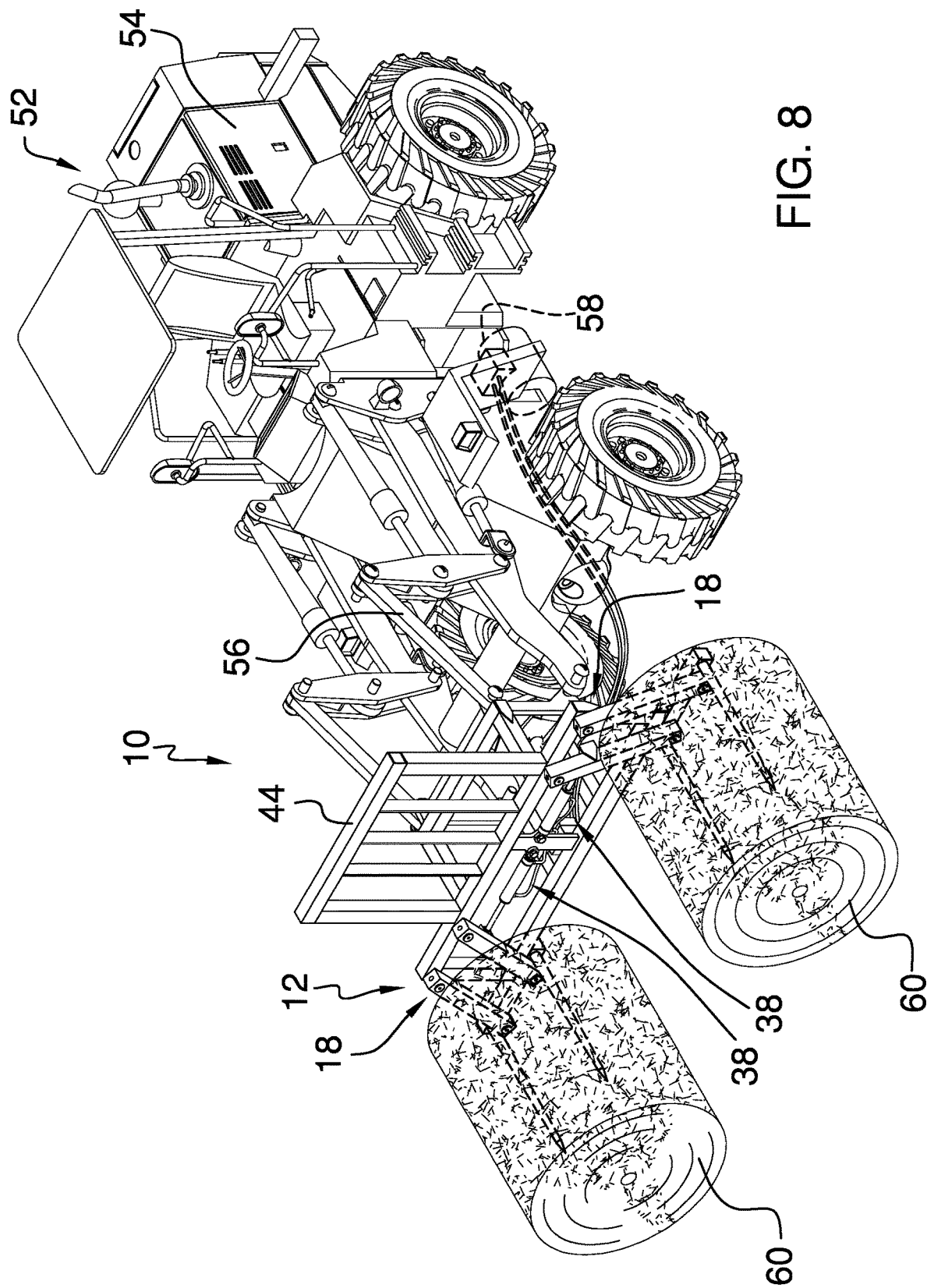
FIG. 8 is an in-use view of an embodiment of the disclosure with a pair of bale holder assemblies in an expanded position.
Figure 9:
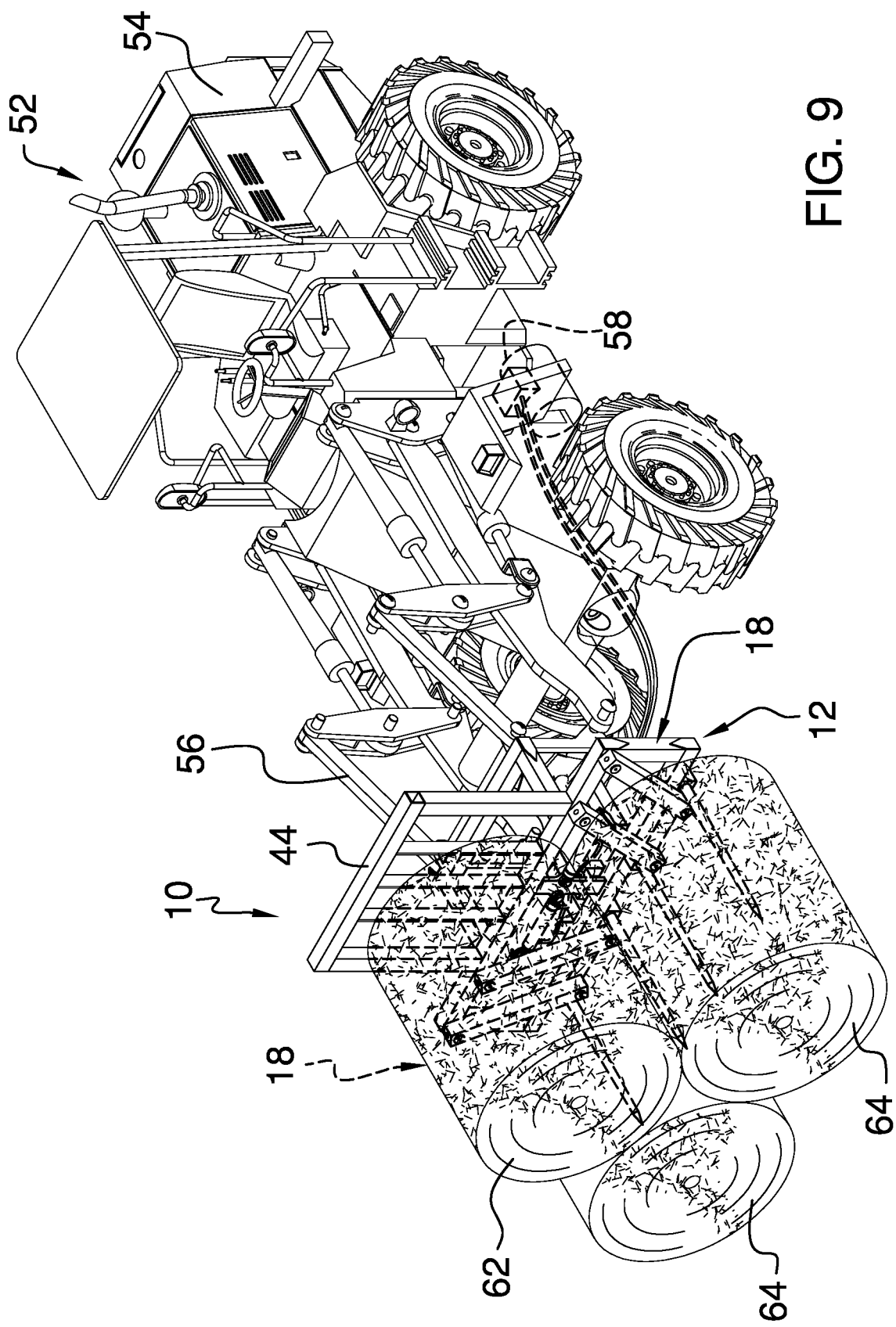
FIG. 9 is an in-use view of an embodiment of the disclosure with a pair of bale holder assemblies in a retracted position and holding three hay bales.

With reference now to the drawings, and in particular to FIGS. 1 through 9 thereof, a new hay bale handling apparatus embodying the principles and concepts of an embodiment of the disclosure and generally designated by the reference numeral 10 will be described.

As best illustrated in FIGS. 1 through 9, the hay bale handling apparatus 10 generally comprises a frame 12 which is mounted to a lift arm assembly 56 of a front end loader 52. In other embodiments, the frame 12 may be mounted to a forklift, a backhoe loader, a tractor, or any suitable vehicle for transporting the frame 12. A pair of bale holder assemblies 18 is coupled to the frame 12, and the bale holder assemblies 18 are laterally spaced from each other with respect to the frame 12. The bale holder assemblies 18 are movable between a retracted condition 20 and an expanded condition 22 wherein the bale holder assemblies 18 move away from each other from the retracted condition 20 to the expanded condition 22.

Each bale holder assembly 18 of the pair of bale holder assemblies 18 comprises a cross member 24, a pair of spears 26, and a linkage 30. The cross member 24 is mounted to the frame 12 via the linkage 30. The spears 26 are coupled to the cross member 24 and are spaced from each other. Each spear 26 of the pair of spears 26 extends forwardly from the cross member 24 with respect to the frame 12 and terminates in a pointed end 28. The pair of spears 26 is configured to impale and hold a hay bale 60. In some embodiment, a spear 26 may be used for each bale holder assembly 18. Notably, multiple spears 26 facilitate holding the hay bale 60 without the hay bale 60 rotating about the bale holder assembly 18, which enables greater positional control of the hay bale 60. The hay bale 60 could be able to freely rotate about a spear 26.

A linkage 30 mounts the cross member 24 to the frame 12 and comprises a pair of arms 32. Each arm 32 is pivotally coupled to the frame 12 at a first end 34 of the arm 32 and is pivotally coupled to the cross member 24 at a second end 36 of the arm 32. The pair of arms 32 has equal lengths between the first end 34 and the second end 36 and is oriented parallel to each other such that the linkage 30 maintains the pair of spears 26 in a constant orientation with respect to the frame 12 between the retracted condition 20 and the expanded condition 22.

A pair of actuators 38 is provided, each of which is coupled to the frame 12 and a respective one of the pair of bale holder assemblies 18. The pair of actuators 38 is operable to move the pair of bale holder assemblies 18 between the retracted condition 20 and the expanded condition 22. Each actuator 38 of the pair of actuators 38 comprises a hydraulic cylinder 40 and is coupled to a central portion 14 of the frame 12 and to one of the pair of arms 32 of the linkage 30 of the respective bale holder assembly 18. A hydraulic pump 58 is operably coupled to the pair of actuators 38 through a pair of hydraulic flow dividers 42, which each distribute hydraulic fluid from the hydraulic pump 58 equally between the pair of actuators 38. The hydraulic pump 58 may be a component of the front end loader 52 and mounted on a body 54 thereof.

A brace 44 is mounted to and extends upwardly from the frame 12. The brace 44 is configured to prevent a top hay bale 62 stacked atop a pair of bottom hay bales 64 held by the pair of bale holder assemblies 18 from moving rearwardly off of the pair of bottom hay bales 64 with respect to the frame 12. The frame 12 may be held at an angle during use such that the top hay bale 62 rests against the brace 44, thus preventing the top hay bale 62 from inadvertently moving forwardly off of the pair of bottom hay bales 64 with respect to the frame 12.

A mounting assembly 46 is mounted to a rear side 16 of the frame 12 and serves to couple the frame 12 to the lift arm assembly 56. The mounting assembly 46 comprises a pair of hooks 48 and a pair of receivers 50, wherein each hook 48 of the pair of hooks 48 and each receiver 50 of the pair of receivers 50 is mounted to the lift arm assembly 56. Any mounting assembly 46 for removably or permanently attaching the frame 12 to the lift arm assembly 56, including pin couplings, hooks 48, threaded fasteners, weldments, rivets, or the like.

In use, the pair of bale holder assemblies 18 are used in conjunction with each other to hold a pair of hay bales 60. The actuators 38 may be operated to move the pair of held hay bales 60 alternately toward and away from each other. In one such use case, hay bales 60 positioned in abutment with each other, such as in a stack on a trailer bed, may be removed and separated two at a time to place in spaced rows so that machinery may fit between the spaced rows to access selected hay bales. In another use case, hay bales 60 lying on the ground with space between them may be brought in abutment with each other for transport on a trailer bed. The hay bale handling apparatus 10 may also be used to carry three hay bales at a time by supporting one top hay bale 62 atop two bottom hay bales 64, wherein the two bottom hay bales 64 are held by the pair of bale holder assemblies 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hay bale handling apparatus comprising:
   a frame, the frame being configured to mount to a vehicle;
   a pair of bale holder assemblies being coupled to the frame, each bale holder assembly being configured for holding a hay bale, the pair of bale holder assemblies being laterally spaced from each other with respect to the frame, the pair of bale holder assemblies being movable between a retracted condition and an expanded condition wherein the pair of bale holder assemblies move away from each other from the retracted condition to the expanded condition;
   at least one actuator being coupled to at least one of the pair of bale holder assemblies, the at least one actuator being operable to move the pair of bale holder assemblies between the retracted condition and the expanded condition;
   wherein the at least one actuator includes a pair of actuators, each actuator of the pair of actuators being coupled to the frame and a respective one of the pair of bale holder assemblies, the pair of actuators being operable to move the pair of bale holder assemblies between the retracted condition and the expanded condition;
   wherein each actuator of the pair of actuators comprises a hydraulic cylinder;
   a hydraulic flow divider being fluidly coupled to each actuator of the pair of actuators, the hydraulic flow divider being configured for being in fluid communication with a hydraulic pump such that hydraulic fluid pumped through the hydraulic flow divider is distributed equally between the pair of actuators;
   a mounting assembly being mounted to a rear side of the frame, the mounting assembly comprising a pair of books and a pair of receivers, each hook of the pair of hooks being configured to mount to a lift arm assembly of a front end loader, each receiver of the pair of receivers being configured to mount to a lift arm assembly of the front end loader via a pin received therethrough;
   wherein each bale holder assembly of the pair of bale holder assemblies comprises at least one spear, the at least one spear extending forwardly from the cross member with respect to the frame and terminating in a pointed end, the at least one spear configured to impale and hold the hay bale;

wherein each bale holder assembly of the pair of bale holder assemblies further comprises a cross member being mounted to the frame;

wherein the at least one spear including a pair of spears being coupled to the cross member and being spaced from each other, each spear of the pair of spears extending forwardly from the cross member with respect to the frame and terminating in a pointed end, the pair of spears being configured to impale and hold the hay bale;

wherein each bale holder assembly of the pair of bale holder assemblies further comprises a linkage mounting the cross member to the frame, the linkage comprising a pair of arms, each arm of the pair of arms being pivotally coupled to the frame at a first end of the arm and being pivotally coupled to the cross member at a second end of the arm, the pair of arms having equal lengths between the first end and the second end and being oriented parallel to each other such that the linkage maintains the pair of spears in a constant orientation with respect to the frame between the retracted condition and the expanded condition; and wherein the at least one actuator includes a pair of actuators, each actuator of the pair of actuators being coupled to the frame and a respective one of the pair of bale holder assemblies, the pair of actuators being operable to move the pair of bale holder assemblies between the retracted condition and the expanded condition, each actuator of the pair of actuators being coupled to a central portion of the frame and to one of the pair of arms of the linkage of the respective bale holder assembly.

2. The apparatus of claim 1, further comprising a brace which is mounted to and extends upwardly from the frame, the brace being configured to prevent a top hay bale stacked atop a pair of bottom hay bales held by the pair of bale holder assemblies from moving rearwardly off of the pair of bottom hay bales with respect to the frame.

3. A front end loader comprising:
a body;
a lift arm assembly mounted to a front side of the body;
a frame being mounted to a front end of the lift arm assembly;
a pair of bale holder assemblies being coupled to the frame, the pair of bale holder assemblies being laterally spaced from each other with respect to the frame, the pair of bale holder assemblies being movable between a retracted condition and an expanded condition wherein the pair of bale holder assemblies move away from each other from the retracted condition to the expanded condition;
at least one actuator being coupled to at least one of the pair of bale holder assemblies, the at least one actuator being operable to move the pair of bale holder assemblies between the retracted condition and the expanded condition;
wherein the at least one actuator includes a pair of actuators, each actuator of the pair of actuators being coupled to the frame and a respective one of the pair of bale holder assemblies, the pair of actuators being operable to move the pair of bale holder assemblies between the retracted condition and the expanded condition;

a hydraulic pump being mounted to the body and being operably coupled to the pair of actuators, each actuator of the pair of actuators comprising a hydraulic cylinder;

a hydraulic flow divider being fluidly coupled to each actuator of the pair of actuators, the hydraulic flow divider being configured for being in fluid communication with a hydraulic pump such that hydraulic fluid pumped through the hydraulic flow divider is distributed equally between the pair of actuators; and a mounting assembly being mounted to a rear side of the frame and coupling the frame to the lift arm assembly, the mounting assembly comprising a pair of hooks and a pair of receivers, each hook of the pair of hooks and each receiver of the pair of receivers being mounted to the lift arm assembly;

wherein each bale holder assembly of the pair of bale holder assemblies comprises at least one spear, the at least one spear extending forwardly from the cross member with respect to the frame and terminating in a pointed end, the at least one spear configured to impale and hold the hay bale;

wherein each bale holder assembly of the pair of bale holder assemblies further comprises a cross member being mounted to the frame;

wherein the at least one spear including a pair of spears being coupled to the cross member and being spaced from each other, each spear of the pair of spears extending forwardly from the cross member with respect to the frame and terminating in a pointed end, the pair of spears being configured to impale and hold the hay bale;

wherein each bale holder assembly of the pair of bale holder assemblies further comprises a linkage mounting the cross member to the frame, the linkage comprising a pair of arms, each arm of the pair of arms being pivotally coupled to the frame at a first end of the arm and being pivotally coupled to the cross member at a second end of the arm, the pair of arms having equal lengths between the first end and the second end and being oriented parallel to each other such that the linkage maintains the pair of spears in a constant orientation with respect to the frame between the retracted condition and the expanded condition; and wherein the at least one actuator includes a pair of actuators, each actuator of the pair of actuators being coupled to the frame and a respective one of the pair of bale holder assemblies, the pair of actuators being operable to move the pair of bale holder assemblies between the retracted condition and the expanded condition, each actuator of the pair of actuators being coupled to a central portion of the frame and to one of the pair of arms of the linkage of the respective bale holder assembly.

4. The apparatus of claim 3, further comprising a brace being mounted to and extending upwardly from the frame, the brace being configured to prevent a top hay bale stacked atop a pair of bottom hay bales held by the pair of bale holder assemblies from moving rearwardly off of the pair of bottom hay bales with respect to the frame.

5. A front end loader comprising:
a body;
a lift arm assembly mounted to a front side of the body;
a frame being mounted to a front end of the lift arm assembly;
a pair of bale holder assemblies being coupled to the frame, the pair of bale holder assemblies being laterally spaced from each other with respect to the frame, the pair of bale holder assemblies being movable between a retracted condition and an expanded condition wherein the pair of bale holder assemblies move away from each other from the retracted condition to the expanded condition, each bale holder assembly of the pair of bale holder assemblies comprising:
a cross member being mounted to the frame;
a pair of spears being coupled to the cross member and being spaced from each other, each spear of the pair of spears extending forwardly from the cross member with respect to the frame and terminating in a pointed end, the pair of spears being configured to impale and hold a hay bale; and
a linkage mounting the cross member to the frame, the linkage comprising a pair of arms, each arm of the pair of arms being pivotally coupled to the frame at a first end of the arm and being pivotally coupled to the cross member at a second end of the arm, the pair of arms having equal lengths between the first end and the second end and being oriented parallel to each other such that the linkage maintains the pair of spears in a constant orientation with respect to the frame between the retracted condition and the expanded condition;
a pair of actuators, each actuator of the pair of actuators being coupled to the frame and a respective one of the pair of bale holder assemblies, the pair of actuators being operable to move the pair of bale holder assemblies between the retracted condition and the expanded condition, each actuator of the pair of actuators comprising a hydraulic cylinder, each actuator of the pair of actuators being coupled to a central portion of the frame and to one of the pair of arms of the linkage of the respective bale holder assembly;
a hydraulic pump being mounted to the body and being operably coupled to the pair of actuators;
a hydraulic flow divider being fluidly coupled to each actuator of the pair of actuators, the hydraulic flow divider being configured for being in fluid communication with a hydraulic pump such that hydraulic fluid pumped through the hydraulic flow divider is distributed equally between the pair of actuators;
a brace being mounted to and extending upwardly from the frame, the brace being configured to prevent a top hay bale stacked atop a pair of bottom hay bales held by the pair of bale holder assemblies from moving rearwardly off of the pair of bottom hay bales with respect to the frame; and
a mounting assembly being mounted to a rear side of the frame and coupling the frame to the lift arm assembly, the mounting assembly comprising a pair of hooks and a pair of receivers, each hook of the pair of hooks and each receiver of the pair of receivers being mounted to the lift arm assembly.

* * * * *